July 31, 1934.  P. GILLI  1,968,486
HEATING APPARATUS FOR INDIRECTLY HEATING HIGH
TEMPERATURE DRYING PLANTS AND THE LIKE
Filed Sept. 9, 1930
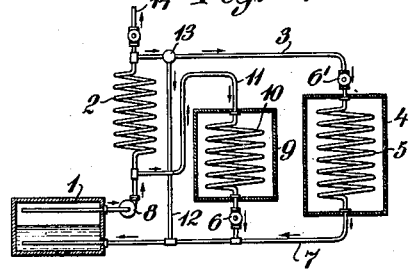
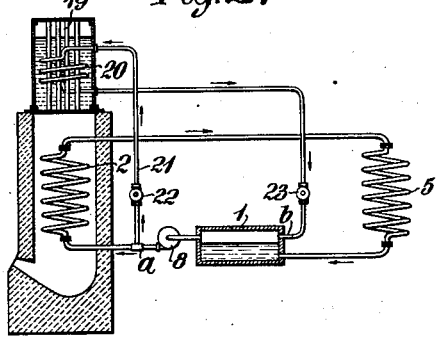
Inventor
Paul Gilli
Attorney Patented July 31, 1934

1,968,486

UNITED STATES PATENT OFFICE 1,968,486

HEATING APPARATUS FOR INDIRECTLY HEATING HIGH TEMPERATURE DRYING PLANTS AND THE LIKE

Paul Gilli, Vienna, Austria

Application September 9, 1930, Serial No. 480,662
In Austria December 3, 1928

8 Claims. (Cl. 237—67)

This invention relates to heating apparatus for indirectly heating high-temperature drying plants, bakery plants, etc., for heating purposes in chemical plants, and the like, in which high-pressure steam, and especially superheated high-pressure steam, serves as the heating medium.

In high-temperature drying plants, such as used in bakeries, heating with steam has hitherto been effected with Perkins tubes, wherein each drying oven is equipped with a heating apparatus comprising a large number of independent Perkins tubes, the one end of which is heated in the fire-box, whilst the other end heats the drying chamber. In such case, differences in pressure occur in the various tubes, on account of the differences in heating and heat emission of the tubes. This necessitates careful control of the fire gases, and is often accompanied by low efficiency.

According to the inventional idea, the heating is intended to be performed by generating steam, at a pressure of thirty atmospheres at least, in a high-pressure boiler of any convenient type, and passing said steam through a superheater and through heat-exchange apparatus, such as heating coils or the like disposed in the drying chambers, where it gives up its heat to the material to be heated, and is then returned to the boiler as steam, or a mixture of both steam and condensate, this circulation being maintained by a circulation pump. The steam generator, circulation pump, superheater and heat exchangers are therefore combined to form a closed unit.

When superheated steam is employed, temperatures can be produced in the drying plants etc., for which Perkins tubes are no longer adequate, and for which electric heating has hitherto been employed.

The heating apparatus according to the invention raises the efficiency of the furnace to that of a modern steam boiler, and, in the case of large plants, the operations can be simplified to an extraordinary extent, with a great saving of fuel and improved heating effect, by substituting a central furnace for the numerous separate furnaces. This arrangement does away with the starting, stopping and regulating of the separate furnaces, the heating effect being obtained by simply controlling the admission or exhausting of the steam. Moreover, the waste heat from the flue gases can be utilized in a suitable manner.

The drawing illustrates, by way of example, several typical embodiments of the subject of the invention in a diagrammatical manner.

Figs. 1 and 2 are diagrammatic views of two plants embodying my invention.

Fig. 1 represents an embodiment of the subject of the invention, in which the steam is generated on the circulation system. The steam circulation pump 8 draws steam from a boiler drum 1, which is not heated by furnace gases, and passes it through the superheater 2, which is composed of coiled tubes and is fire-heated. From the superheater 2, part of the steam is passed through the pipe 3 to a heat exchanger 4, where it gives up its heat through the coil 5. The steam, or mixture of condensate and steam, is returned to the boiler 1 by way of the pipe 7. In a second heat exchanger 9, the heating coil 10 is supplied with wet steam, which is delivered, through the pipe 11, out of the wet-steam pipe of the boiler 1, at a point between the pump 8 and the superheater 2. The heating of the heat exchangers 4 and 9 is regulated by means of the control valves 6 and 6'. The valve 6 for regulating the wet-steam heat exchanger 9 is disposed on the further side of the heating coil 10, whilst the valve 6' for the hot-steam heat exchanger 4 is on the near side of the coil 5. In parallel with the heat exchanger 4 is a by-pass pipe 12, which branches off from the cock 13 in the hot-steam pipe 3 and debouches into the return pipe 7 to the boiler 1. In addition to control purposes, this by-pass 12 serves to pass into the boiler drum 1 the superheated steam required for effecting evaporation in said boiler.

It is sometimes advantageous to lead the by-pass pipe 12 back into the boiler drum 1 direct.

A by-pass of this kind is suitable in any event (and not merely in raising steam by the circulation method) in order to improve the control and fire management of the plant, and ensure the safety of the superheater.

Hot steam, for power or other purposes, is also drawn off through the pipe 14 on the further side of the superheater.

It is particularly advantageous to mount the circulation pump 8 between the steam generator and the super-heater 2, so that a positive flow is obtained in the superheater 2 in all circumstances, and the pump delivers the heating steam through the heat exchangers and back into the boiler. This arrangement of the circulation pump 8 is also advisable in the event of the heating steam condensing in the heat exchangers, under which conditions the condensate is returned to the boiler 1 by the circulation pump 8.

Mounting the circulation pump 8 between the steam generator 1 and the superheater 2, as in Fig. 1, is particularly suitable when some of the heating coils are to be supplied with hot steam, and others with wet steam. In this way, it is possible to attain a determined distribution of temperature in a drying chamber, as is necessary, for example, in bake ovens.

For better utilization of the heating gases for the steam generator, the heat of the flue gases may be turned to account in a waste-heat boiler, the steam from which is employed for driving the auxiliary appliances of the boiler plant, the circulation pump and other purposes. Of course, the steaming capacity of this waste-heat boiler does not always correspond with the demand for steam, the result being, in the case of fluctuating operation, considerable losses of steam or unsatisfactory utilization of the heat of the flue gases, and therefore reduced working efficiency.

This drawback can be easily obviated by making the high-pressure heating surface of greater dimensions, in comparison with the heating surface of the waste-heat boiler, than corresponds to the actual consumption. The surplus heat absorption of the high-pressure boiler is balanced by transmitting heat, through a coil or the like, to the waste-heat boiler, without reducing the contents of the high-pressure boiler. This is particularly important in the case of small heating plants, since, with such boilers, the feed arrangements are calculated only in accordance with the small losses incurred.

When the demand for steam from the waste-heat boiler is large, the said heat transmitting coil can be given a higher charge, being throttled down, or disconnected entirely, when the steam consumption is low. The high-pressure heating coil can be disposed in the water for the waste-heat boiler, in a tank or the like communicating with the water space of the boiler.

Fig. 2 shows an embodiment in which the steam is raised by the circulation method as in the embodiment according to Fig. 1, the same reference characters being used. The waste-heat boiler 19, which is heated by the flue gases from the superheater 2, is provided with a heating coil 20, the supply pipe 21 of which branches off at $a$ on the further side of the circulation pump 8, whilst the delivery pipe leads at $b$ into the steam generator 1. These pipes are adapted to be closed by the valves 22 and 23, the valve 22 also serving as a regulating valve. This valve is preferably of the automatic type, so that it adjusts itself in accordance with the pressure in the waste-heat boiler 19.

This supplementary heating of the waste-heat boiler by means of high-pressure steam is particularly suitable in plants employed solely for heating, in which a particularly high temperature is necessary in the heating chamber. As a rule, the steam in the heat exchangers must be cooled nearly to the saturation point, in order to prevent a rise in pressure in the high-pressure boiler and consequent blowing-off. By the interposition of a heating device for the waste-heat boiler in the heating system, a considerable amount of heat is continuously carried off in the heating coil 20 and utilized for raising low-pressure steam, thus supplying condensate to the boiler drum 1. The exhaust steam from the heat exchangers can therefore still be highly superheated, and the heat of the superheater employed for re-evaporating the condensate returning from the heating coil 20 into the boiler drum 1. The plant can therefore operate with a very high temperature in the heat exchangers.

I claim:—

1. Heating apparatus for indirectly heating high temperature plants and the like by means of high pressure steam, comprising in combination a preferably non-externally heated vessel partially filled with water for generating steam, a circulation pump, a superheater, and a plurality of heat exchangers, in which the steam yields up heat to the material to be heated, all these elements forming a closed high pressure system in which the discharge ends of said heat exchangers are connected in parallel to the receiving end of said vessel, said pump maintaining a circulation in said system and being inserted between the delivery end of said vessel and said superheater, part of said heat exchangers having their inlet end connected to the delivery end of said pump at a point intermediate said pump and said superheater, and being positively supplied by said pump with steam directly from said vessel, the remainder of said heat exchangers having their inlet end connected to the delivery end of, and being supplied with steam routed through, and superheated by said superheater, and means for supplying superheated steam from said superheater directly to said vessel.

2. Heating apparatus for indirectly heating high temperature plants and the like by means of high pressure steam, comprising in combination a preferably non-externally-heated vessel partially filled with water, a circulation pump, a superheater and a heat exchanging apparatus, in which the steam yields up heat to the material to be heated, all of these elements being in series with one another and together forming a closed high pressure system, said pump maintaining a circulation in said system and being inserted between the steam delivery end of said vessel and said superheater, and a by-pass conduit between said superheater and said vessel, disposed in parallel with the heat exchanger and forming part of said high pressure system.

3. Heating apparatus for indirectly heating high temperature plants and the like by means of high pressure steam, comprising in combination a preferably non-externally-heated vessel partially filled with water, a circulation pump, a superheater and a heat exchanging apparatus, in which the steam yields up heat to the material to be heated, all these elements being in series with one another and together forming a closed high pressure system, said pump maintaining a circulation in said system and being inserted between the steam delivery end of said vessel and said superheater, and a by-pass conduit between said superheater and said vessel, disposed in parallel with the heat exchanger and forming part of said closed high pressure system, the water in said vessel being converted into steam by the heat yielded to it by the fluid discharged from said heat exchanger and by the superheated steam supplied through said by-pass conduit.

4. Heating apparatus for indirectly heating high temperature plants and the like by means of high pressure steam, comprising in combination a preferably non-externally-heated vessel partially filled with water, a circulation pump, a superheater and a plurality of heat exchangers, in which the heating steam yields up heat to the material to be heated, all these elements forming a closed high pressure system in which the discharge ends of said heat exchangers are connected in parallel to the receiving end of said vessel, said pump maintaining a circulation in said system and being inserted between the delivery end of said vessel and said superheater, part of said heat exchangers having their inlet end connected to the delivery end of said pump at a point intermediate said pump and said superheater, and being positively supplied by said pump with steam directly from the vessel, the remainder of said heat exchangers having their inlet end connected to the delivery end of, and being supplied with steam routed through, and superheated by said superheater, and means for supplying superheated steam from said superheater directly to said vessel, the water in said vessel being converted into steam by the heat yielded to it by the fluid discharged from said heat exchangers, and by the superheated steam supplied through said means.

5. Heating apparatus for indirectly heating high temperature plants by means of superheated high pressure steam, comprising in combination, a preferably non-externally-heated vessel partially filled with water, a circulation pump, a superheater, at least one heat exchanger in which the superheated steam yields up part of its heat to the material to be heated in the plant, means interposed between the delivery end of said pump and the inlet end of said vessel for utilizing the heat of non-superheated high pressure steam supplied directly from the vessel, means for controlling the flow through said utilizing means, all these elements being combined to form a closed high pressure system, said pump maintaining a circulation in said system, and being inserted therein at the steam delivery end of said vessel, and means for supplying super-heated steam from said superheater directly to said vessel.

6. Heating apparatus for indirectly heating high temperature plants and the like by means of superheated high pressure steam, comprising in combination a preferably non-heated vessel with water and steam space, a circulation pump, a superheater, at least one heat exchanger, in which the superheated steam yields up heat to the material to be heated, all these elements being combined in series to form a closed high pressure system, said pump being inserted between the steam delivery end of said vessel and said superheater, drawing saturated steam from the steam space of the vessel and conveying this steam through the superheater and the heat exchanger back into the water space of said vessel, a heat compensating device consisting of heating coils and the like, forming part of said closed high pressure system, heated by steam, which is also conveyed by said circulation pump and after leaving said compensating device returned to said vessel, at least at a rate corresponding to the amount of waste heat of superheat contained in the steam discharged from said heat exchanger, and a low pressure steam generator heated by waste heating gases from said superheater and also forming part of said heat compensating device.

7. Heating apparatus for indirectly heating high temperature plants and the like by means of superheated high pressure steam, comprising in combination a preferably non-externally heated vessel partially filled with water, a circulation pump, a superheater, at least one heat exchanger, in which the superheated steam yields up heat to the material to be heated, all these elements being combined in series to form a closed high pressure system, said pump being inserted between the steam delivery end of said vessel and said superheater, drawing saturated steam from the steam space of the vessel and conveying this steam through the superheater and the heat exchanger back into the water space of said vessel, a heat compensating device consisting of heating coils or the like, forming part of said closed high pressure system, heated by steam, which is also conveyed by said circulation pump and after leaving said compensating device returned to said vessel, at least at a rate, corresponding to the amount of waste heat of superheat contained in the steam discharged from said heat exchanger, and a by-pass conduit between said superheater and said vessel, disposed in parallel with the heat exchanger and forming part of said high pressure system.

8. Heating apparatus for indirectly heating high temperature plants and the like by means of superheated high pressure steam, comprising in combination a preferably non-externally heated vessel partially filled with water, a circulation pump, a superheater, at least one heat exchanger, in which the superheated steam yields up heat to the material to be heated, all these elements being combined in series to form a closed high pressure system, said pump being inserted between the steam delivery end of said vessel and said superheater, drawing saturated steam from the steam space of the vessel and conveying this steam through the superheater and the heat exchanger back into the water space of said vessel, a heat compensating device consisting of heating coils or the like, forming part of said closed high pressure system, heated by steam, which is also conveyed by said circulation pump and after leaving said compensating device returned to said vessel, at least at a rate, corresponding to the amount of waste heat of superheat contained in the steam discharged from said heat exchanger, and said heat compensating device generating low pressure steam for auxiliary appliances, such as the circulation pump and for subsidiary operations.

PAUL GILLI.